US008984661B2

(12) United States Patent
Weber-Bargioni et al.

(10) Patent No.: US 8,984,661 B2
(45) Date of Patent: Mar. 17, 2015

(54) PROBES FOR MULTIDIMENSIONAL NANOSPECTROSCOPIC IMAGING AND METHODS OF FABRICATION THEREOF

(71) Applicants: Alexander Weber-Bargioni, Albany, CA (US); Stefano Cabrini, Albany, CA (US); Wei Bao, Albany, CA (US); Mauro Melli, Albany, CA (US); Eli Yablonovitch, Oakland, CA (US); Peter J. Schuck, Oakland, CA (US)

(72) Inventors: Alexander Weber-Bargioni, Albany, CA (US); Stefano Cabrini, Albany, CA (US); Wei Bao, Albany, CA (US); Mauro Melli, Albany, CA (US); Eli Yablonovitch, Oakland, CA (US); Peter J. Schuck, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/033,070

(22) Filed: Sep. 20, 2013

(65) Prior Publication Data
US 2014/0090118 A1    Mar. 27, 2014

Related U.S. Application Data

(60) Provisional application No. 61/704,270, filed on Sep. 21, 2012.

(51) Int. Cl.
  *G01Q 70/16*    (2010.01)
  *G01Q 60/22*    (2010.01)
  *B82Y 20/00*    (2011.01)
  *B82Y 35/00*    (2011.01)

(52) U.S. Cl.
  CPC .............. *G01Q 60/22* (2013.01); *B82Y 20/00* (2013.01); *B82Y 35/00* (2013.01)

USPC .................................. 850/60; 850/52; 850/61

(58) Field of Classification Search
  CPC ....... G01Q 70/02; G01Q 70/08; G01Q 70/10; G01Q 70/14; G01Q 70/16
  USPC ........................ 850/52, 56, 57, 58, 59, 60, 61
  See application file for complete search history.

(56) References Cited

U.S. PATENT DOCUMENTS

| 2007/0151989 | A1* | 7/2007 | Espinosa et al. ............ 222/462 |
| 2008/0098805 | A1* | 5/2008 | Jin et al. ...................... 73/105 |
| 2008/0272299 | A1* | 11/2008 | Jin et al. ...................... 250/310 |
| 2009/0133171 | A1* | 5/2009 | Jin ............................... 850/60 |

OTHER PUBLICATIONS

Monika Fleischer, "Near-field scanning optical microscopy nanoprobes," Nanotechnology Reviews. vol. 1, Issue 4, pp. 313-338.
Wei Bao et al., "Mapping Local Charge Recombination Heterogeneity by Multidimensional Nanospectroscopic Imaging," Science Dec. 7, 2012: 338 (6112), 1317-1321.
J. Stadler, T. Schmid, R. Zenobi, "Developments in and practical guidelines for tip-enhanced Raman spectroscopy" Nanoscale 4, 1856 (2012).

(Continued)

*Primary Examiner* — Nicole Ippolito
(74) *Attorney, Agent, or Firm* — Lawrence Berkeley National Laboratory (57) ABSTRACT

This disclosure provides systems, methods, and apparatus related to probes for multidimensional nanospectroscopic imaging. In one aspect, a method includes providing a transparent tip comprising a dielectric material. A four-sided pyramidal-shaped structure is formed at an apex of the transparent tip using a focused ion beam. Metal layers are deposited over two opposing sides of the four-sided pyramidal-shaped structure.

20 Claims, 8 Drawing Sheets

(56) References Cited

OTHER PUBLICATIONS

Y. Wang, W. Srituravanich, C. Sun, X. Zhang, "Plasmonic Nearfield Scanning Probe with High Transmission," Nano Lett. 8, 3041 (2008).
J. N. Farahani, D. W. Pohl, H. J. Eisler, B. Hecht, "Single Quantum Dot Coupled to a Scanning Optical Antenna: A Tunable Superemitter," Phys. Rev. Lett. 95, 017402 (2005).
A. Weber-Bargioni et al., "Hyperspectral Nanoscale Imaging on Dielectric Substrates with Coaxial Optical Antenna Scan Probes" Nano Lett. 11, 1201 (2011).
M. Staffaroni, J. Conway, S. Vedantam, J. Tang, E. Yablonovitch, "Circuit analysis in metal-optics" Photonics Nanostructures Fundam. Appl. 10, 166 (2012).
M. I. Stockman, "Nanofocusing of Optical Energy in Tapered Plasmonic Waveguides" Phys. Rev. Lett. 93, 137404 (2004).
P. Ginzburg, D. Arbel, M. Orenstein, "Gap plasmon polariton structure for very efficient microscale-to-nanoscale interfacing" Opt. Lett. 31, 3288 (2006).
S. Vedantam et al., "A Plasmonic Dimple Lens for Nanoscale Focusing of Light" Nano Lett. 9, 3447 (2009).

* cited by examiner

PROBES FOR MULTIDIMENSIONAL NANOSPECTROSCOPIC IMAGING AND METHODS OF FABRICATION THEREOF

RELATED APPLICATIONS

This application claims priority to U.S. Provisional Patent Application No. 61/704,270, filed Sep. 21, 2012. This application is related to U.S. patent application Ser. No. 13/083,228, filed Apr. 8, 2011, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to optical spectroscopy and more particularly to devices operable to generate a focused optical beam spot and methods of fabrication thereof.

BACKGROUND

An ongoing challenge to understanding matter at the nanoscale is the difficulty in carrying out local optical spectroscopy. On a fundamental level, this should be possible by squeezing light beyond the diffraction limit. Optical-antenna-based geometries have been designed to address this nanospectroscopy imaging problem by transforming light from the far-field to the near-field, but unfortunately with serious limitations on sensitivity, bandwidth, resolution, and/or sample types.

SUMMARY

A strategy that overcomes the limitations of optical-antenna-based geometries (e.g., sensitivity, bandwidth, resolution, and/or sample types), based on a unique geometry capable of efficiently coupling far-field light to the near-field and vice-versa without background illumination, and over a wide range of wavelengths, is described herein. In some embodiments, the geometry includes a campanile probe, a three-dimensional tapered structure terminating in a nanometer sized gap, with a shape resembling that of a "campanile" bell tower.

One innovative aspect of the subject matter described in this disclosure can be implemented a method including: (a) providing a transparent tip comprising a dielectric material; (b) forming a four-sided pyramidal-shaped structure at an apex of the transparent tip using a focused ion beam; and (c) depositing metal layers over two opposing sides of the four-sided pyramidal-shaped structure.

In some embodiments, the method further includes after operation (c), forming a gap between the metal layers at an apex of the four-sided pyramidal-shaped structure. In some embodiments, the method further includes, before operation (c), depositing adhesion layers on the two opposing sides of the four-sided pyramidal-shaped structure, with the metal layers being deposited on the adhesion layers. In some embodiments, depositing the adhesion layers is performed with a shadow evaporation process, with the adhesion layers comprising a metal.

In some embodiments, the method further comprises after operation (c), depositing a dielectric layer over the four-sided pyramidal-shaped structure, including the metal layers. In some embodiments, the dielectric layer is about 2 nanometers to 5 nanometers thick. In some embodiments, the dielectric layer is selected from a group consisting of silicon oxide, aluminum oxide, hafnium oxide, and silicon nitride.

In some embodiments, operation (c) is performed with a shadow evaporation process. In some embodiments, the metal layers are selected from a group consisting of gold, silver, copper, and aluminum. In some embodiments, the metal layers are about 25 nanometers to 75 nanometers thick. In some embodiments, the gap is about 1 nanometer to 100 nanometers wide between the metals layers deposited on the two opposing sides of the four-sided pyramidal-shaped structure. In some embodiments, the gap is about 25 nanometers to 75 nanometers deep in the dielectric material. In some embodiments, the dielectric material is selected from a group consisting of an optically transparent polymer, diamond, silicon oxide, silicon nitride, aluminum oxide, indium tin oxide, and hafnium oxide.

Another innovative aspect of the subject matter described in this disclosure can be implemented a method including: (a) providing an transparent tip comprising a dielectric material; (b) forming a four-sided pyramidal-shaped structure at an apex of the transparent tip using a focused ion beam; and (c) depositing doped semiconductor layers over two opposing sides of the four-sided pyramidal-shaped structure.

In some embodiments, the method further includes after operation (c), forming a gap between the doped semiconductor layers at an apex of the four-sided pyramidal-shaped structure. In some embodiments, the doped semiconductor layers are selected from a group consisting of doped-titanium oxide, doped-zirconium oxide, doped-zinc oxide, and tin-doped indium oxide (ITO).

Another innovative aspect of the subject matter described in this disclosure can be implemented a device including a transparent tip, metal layers, and a dielectric layer. The transparent tip comprises a dielectric material, with an apex of the transparent tip including a four-sided pyramidal-shaped structure. The metal layers are disposed over two opposing sides of the four-sided pyramidal-shaped structure, with an apex of the four-sided pyramidal-shaped structure including a gap between the metal layers. The dielectric layer is disposed on the four-sided pyramidal-shaped structure, including the metal layers.

In some embodiments, the device further includes adhesion layers disposed on the two opposing sides of the four-sided pyramidal-shaped structure, with the metal layers being disposed on the adhesion layers. In some embodiments, the adhesion layers are selected from a group consisting of titanium and chromium.

In some embodiments, the dielectric layer is selected from a group consisting of silicon oxide, aluminum oxide, hafnium oxide, and silicon nitride. In some embodiments, the dielectric layer is about 2 nanometers to 5 nanometers thick.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

INTRODUCTION

Various near-field probe geometries have been engineered with extraordinary optical transmission or with coupled optical antenna structures directly on the scan-probe apex, greatly improving coupling efficiencies. However, these generally rely on resonant structures with limited spectral bandwidth and have often used excitation modalities that are not background-free. Of note are recent approaches combining elements of apertureless near-field scanning microscopy (a-NSOM) tips with efficient photon-to-plasmon coupling structures that can be illuminated far from the sample. When designed correctly, these types of probes can be broadband since they exploit adiabatic plasmonic compression.

There is, however, one drawback to these probes: maximum enhancement is only achieved in the tip-substrate gap mode. The tip-substrate gap mode can yield large near-field signals, but requires both a metallic substrate and a very small tip-substrate gap. Therefore, only very thin samples (e.g., molecular monolayers) can be studied.

Embodiments described herein can overcome all these problems, offering a different concept that unites broadband field enhancement and confinement with efficient bi-directional coupling between far-field and near-field electromagnetic energy, thereby enabling the translation of the wide spectrum of optical measurement modalities to the nanometer scale.

Device and Methods

Embodiments of a campanile probe disclosed herein are based on a three-dimensional tapered metal-insulator-metal (MIM) structure ending in a nanogap. Simulations have shown that this geometry can provide efficient coupling between far- and near-fields since the fundamental mode in an MIM structure is supported without any cut-off frequency, no matter how thin the insulating layer. In the optical regime, where plasmonic effects become important at small length scales, it has been shown that efficient delivery of far-field light to an ultra-small region is possible in two dimensions using a tapered planar MIM structure (>70% conversion efficiency), and in three dimensions with a dimple lens structure. Equally important is the fact that the bi-directional coupling of the campanile probe is efficient over a large bandwidth, taking advantage of an adiabatically-tapered geometry utilized at longer wavelengths (e.g., the microwave and terahertz regimes) to provide a simple broadband method for effectively overcoming the diffraction limit. The bandwidth may be limited by metal absorption at short wavelengths, and can be extended well into the infrared region (and beyond). Other metals can be used to access the blue or ultraviolet (UV) regions.

Figure 1:
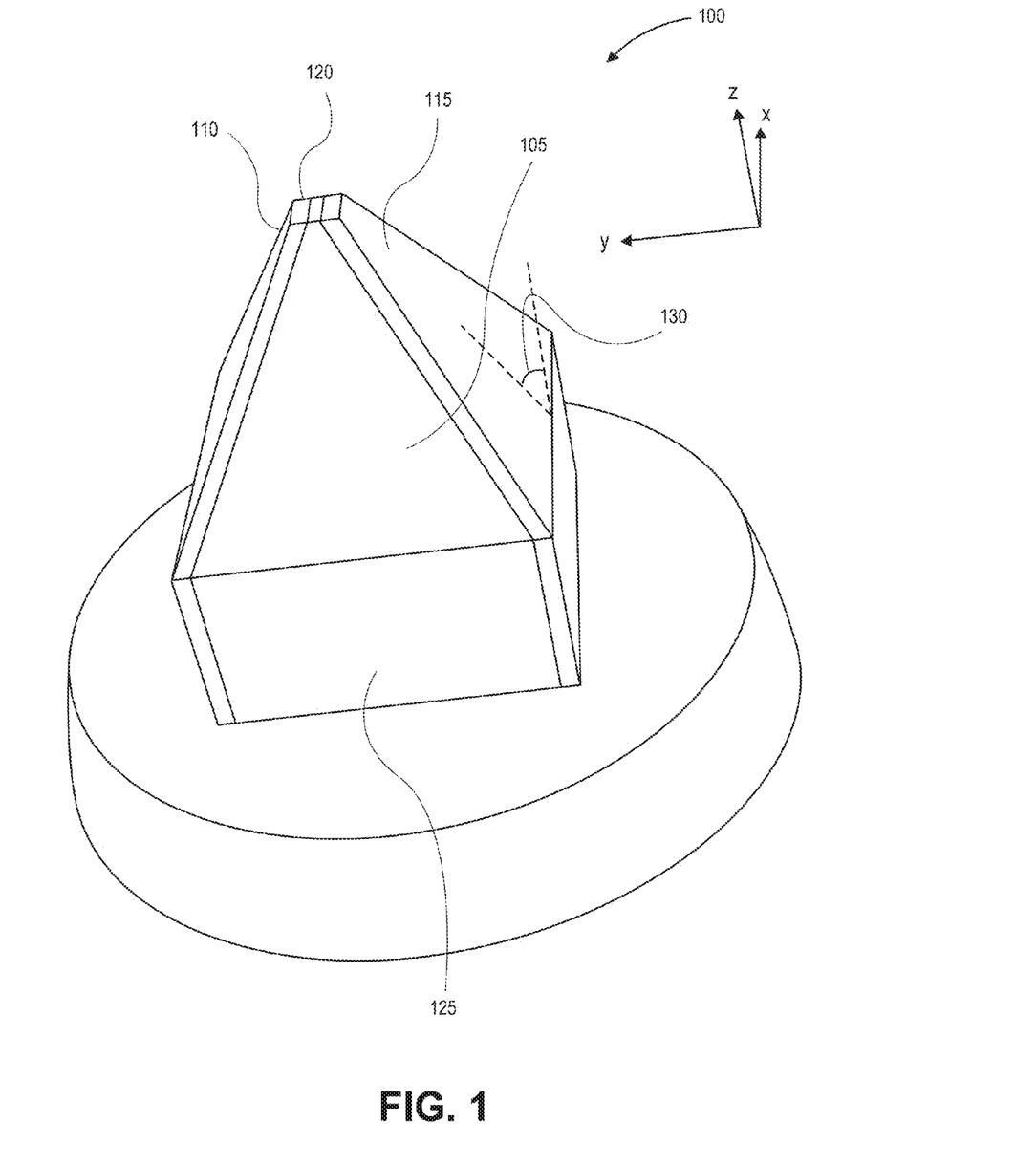
FIG. 1 shows an example of an isometric illustration of a campanile probe.

FIG. 1 shows an example of an isometric illustration of a campanile probe. A campanile probe 100 comprises a transparent tip comprising a dielectric material 105. An apex of the transparent tip includes a four-sided pyramidal-shaped structure. Metal layers 110 and 115 are disposed over two opposing sides of the four-sided pyramidal-shaped structure. An apex 120 of the four-sided pyramidal-shaped structure includes a gap between the metal layers 110 and 115.

In some embodiments, the dielectric material 105 of the transparent tip may comprise an optically transparent material; an optically transparent material is a material that allows light (e.g., visible light, infrared light, or ultraviolet light) to pass through the material without being scattered. In some embodiments, the dielectric material 105 of the transparent tip may comprise an optically transparent polymer, diamond, silicon oxide ($SiO_2$, SiO, $SiO_x$, where x is a non-integer number), silicon nitride ($Si_3N_4$), aluminum oxide ($Al_2O_3$), indium tin oxide (ITO, a solid solution of indium oxide ($In_2O_3$) and tin oxide ($SnO_2$)), and hafnium oxide ($HfO_2$).

In some embodiments, the metal layers 110 and 115 may comprise gold, silver, copper, or aluminum. In some embodiments, the metal layers may be about 25 nanometers (nm) to 75 nm thick, or about 50 nm thick. In some embodiments, the metal layer may be greater than about 75 nm thick. Such a campanile probe having metal layers may be used with visible light.

In some embodiments, the campanile probe 100 may include adhesion layers (now shown) disposed on the two opposing sides of the four-sided pyramidal-shaped structure. The metal layers 110 and 115 are disposed on the adhesion layers. The adhesion layers may aid in adhering the metal layers 110 and 115 to the dielectric material 105.

In some embodiments, the adhesion layers may comprise a metal. For example, in some embodiments, the adhesion layers may comprise titanium or chromium. In some embodiments, the adhesion layers may be about 1 nm to 5 nm thick, or about 2 nm thick.

In some embodiments, the campanile probe 100 may include a dielectric layer (not shown) disposed on the four-sided pyramidal-shaped structure, including the metal layers. In some embodiments, the dielectric layer comprises silicon oxide, aluminum oxide, hafnium oxide, or silicon nitride. In some embodiments, the dielectric layer may be about 2 nm to 5 nm thick.

In some embodiments, the dielectric layer may protect the metal layers 110 and 115 from oxidation and from mechanical damage when the campanile probe 100 is in use. Such a dielectric layer also may aid in keeping the metal layers 110 and 115 disposed on or over the four-sided pyramidal-shaped structure. For example, the metal layers of a campanile probe that does not include the dielectric layer may peel away from or flake off of the four-sided pyramidal-shaped structure when the campanile probe is in operation. Further, the dielectric layer may reduce or prevent atomic migration of the metal layers 110 and 115 (e.g., due to thermal effects), which may also aid in keeping the metal layers 110 and 115 disposed on or over the four-sided pyramidal-shaped structure. In some embodiments, the dielectric layer may prevent electrical contact between a sample being studied and the campanile probe.

In some embodiments, a substantially square or a rectangular base 125 of the dielectric material 105 comprising the four-sided pyramidal-shaped structure may have dimensions of about 50 nm to 20 microns by about 50 nm to 20 microns, about 50 nm to 5 microns by about 50 nm to 5 microns, or about 100 nm to 200 nm by about 100 nm to 200 nm. In some embodiments, at least one dimension of the substantially square or a rectangular base 125 (i.e., a length or a width) may have a dimension that is that is larger than the wavelength of the electromagnetic radiation to be used with the campanile probe 100.

In some embodiments, the substantially square or a rectangular base 125 may have a height of about 1 nm to 5 microns or about 1 nm to 1 micron. In some embodiments, the substantially square or a rectangular base 125 may have a specific height to aid in the fabrication process. In some embodiments, the four-sided pyramidal-shaped structure may have a square or a rectangular base, but the base may have no height or a height of zero.

In some embodiments, an angle 130 at which a side of the four-sided pyramidal-shaped structure slopes compared to a vertical axis of the campanile probe 100 may be about 15 degrees to 45 degrees, about 20 degrees to 40 degrees, or about 30 degrees.

Figure 2A:
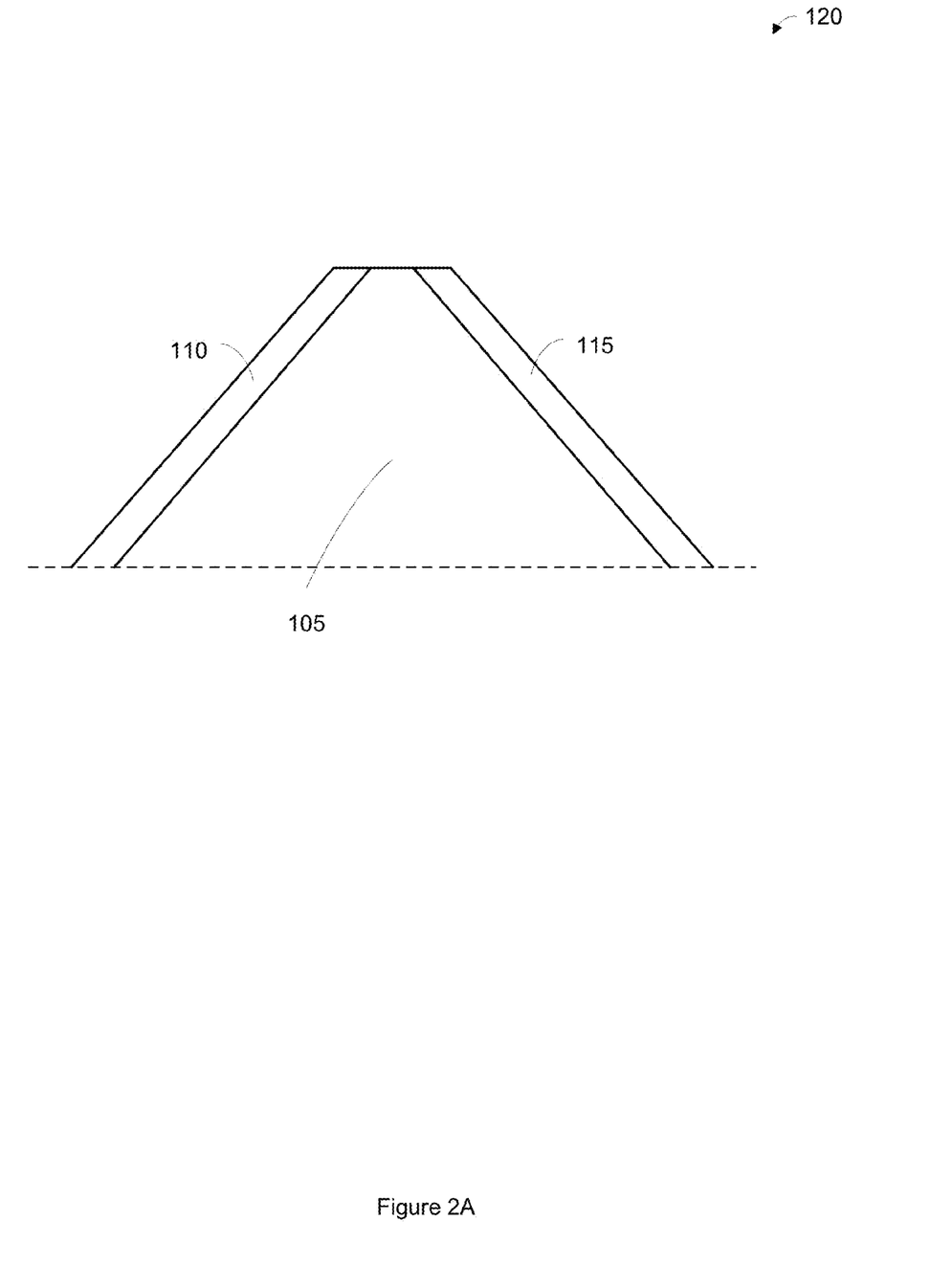
FIGS. 2A, 2B, and 3 show examples of cross-sectional schematic illustrations of the apex of a four-sided pyramidal-shaped structure of a campanile probe.
Figure 2B:
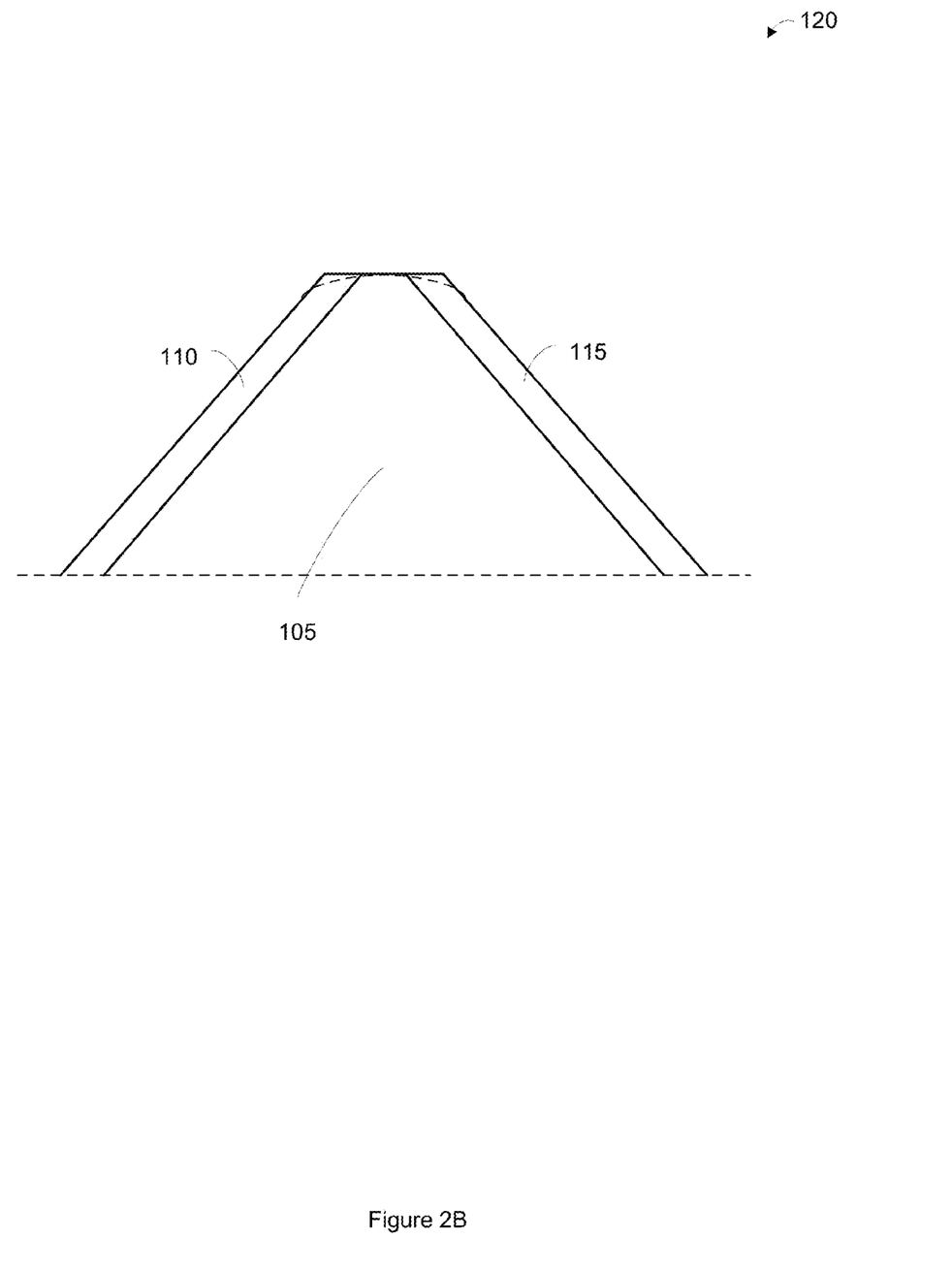
Figure 3:
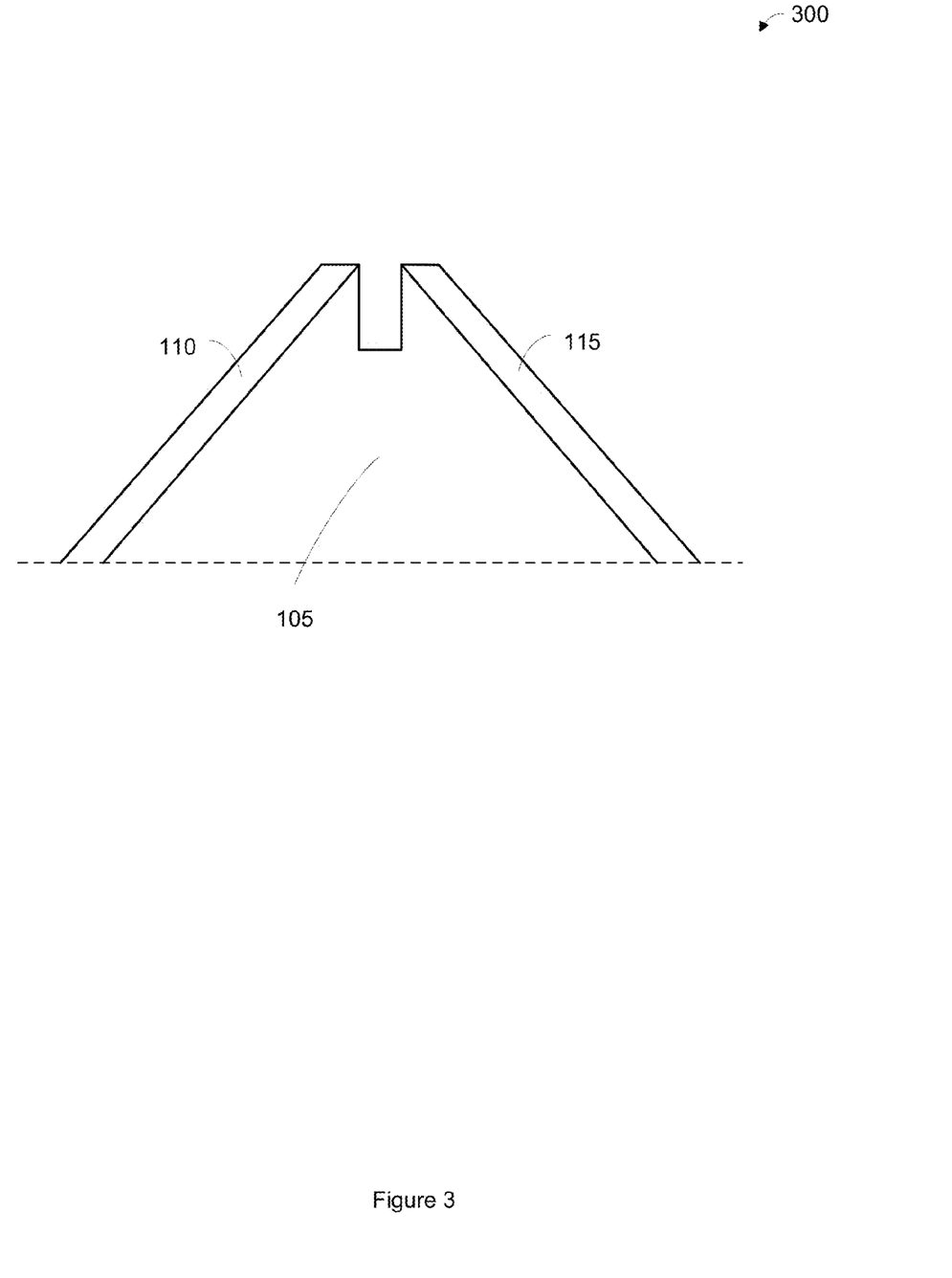

FIGS. 2A, 2B, and 3 show examples of cross-sectional schematic illustrations of the apex of a four-sided pyramidal-shaped structure of a campanile probe. As shown in FIG. 2A, the apex 120 of the four-sided pyramidal-shaped structure includes a gap between the metal layers 110 and 115. In some embodiments, the gap may be about 1 nm to 100 nm wide, about 2 nm to 50 nm wide, or less about 10 nm wide, between the metal layers 110 and 115. In some embodiments, the gap may define a substantially flat surface of the dielectric material 105 of the transparent tip, and separate the metal layers 110 and 115 by about 1 nm to 100 nm or about 2 nm to 50 nm. In some embodiments, a length of the gap (i.e., into the paper of the cross sectional schematic illustration shown in FIG. 2A) may be about 1 nm to 15 nm, about 15 nm to 45 nm, or about 30 nm.

In some embodiments, the apex of the four-sided pyramidal-shaped structure may include a substantially flat surface comprising the dielectric material 105. In some embodiments, the edges of the metal layers 110 and 115 may be tapered, as shown by the dashed lines at that apex of the four-sided pyramidal-shaped structure shown in FIG. 2B.

In some embodiments, some or all of the dielectric material may be removed from the gap between the two metal layers. An example of such an apex of a four-sided pyramidal-shaped structure is shown in FIG. 3. The apex 300 of the four-sided pyramidal-shaped structure shown in FIG. 3 includes a gap between the metal layers 110 and 115. In some embodiments, the gap may be about 1 nm to 100 nm wide, about 2 nm to 50 nm wide, or less than about 10 nm wide, between the metal layers 110 and 115. The gap also may have a depth of about 25 nm to 75 nm; i.e., the gap may define an open region that does not include any material (i.e., the dielectric material or the metal layers). In some embodiments, a length of the gap (i.e., into the paper of the cross sectional schematic illustration shown in FIG. 2B) may be about 1 nm to 15 nm, about 15 nm to 45 nm, or about 30 nm. In some embodiments, an open gap as shown in FIG. 3 may push the near field spot generated by a campanile probe from the apex of the four-sided pyramidal-shaped structure, which may enable the campanile probe to couple with a sample being studied more efficiently.

A campanile probe including metal layers is operable with visible light. In some embodiments, instead of the four-sided pyramidal structure of the transparent tip having metal layers disposed over two opposing sides of the four-sided pyramidal structure, doped semiconductor layers or layers of other ceramic materials are disposed over two opposing sides of the four-sided pyramidal structure. Such a campanile probe including doped semiconductor layers or layers of other ceramic materials may be operable with infrared light. In some embodiments, the doped semiconductor layers may include conductive oxide layers or doped metal oxide layers. For example, in some embodiments, the doped metal oxide layers include layers of doped-titanium oxide, doped-zirconium oxide, doped-zinc oxide, and tin-doped indium oxide (ITO). In some embodiments, the layers of ceramic material may include titanium nitride.

Using nanofabrication techniques, the campanile probe 100 can be incorporated into many different transparent tips associated with scanning probe tips, including atomic force microscopy (AFM) cantilevers and optical fibers such as those used in conventional aperture-based NSOM.

Figure 4:
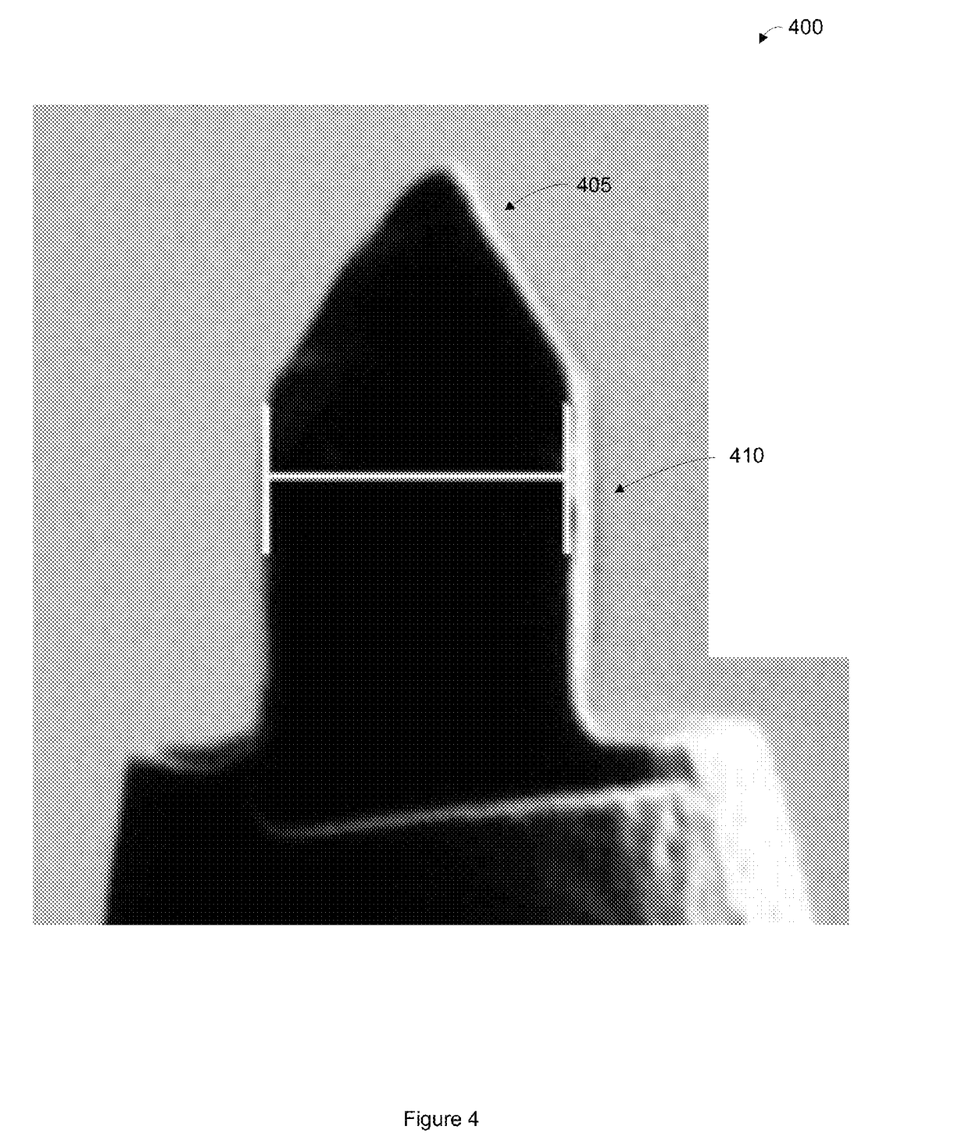
FIGS. 4 and 5 show examples of scanning electron microscope (SEM) photographs of a campanile probe.
Figure 5:
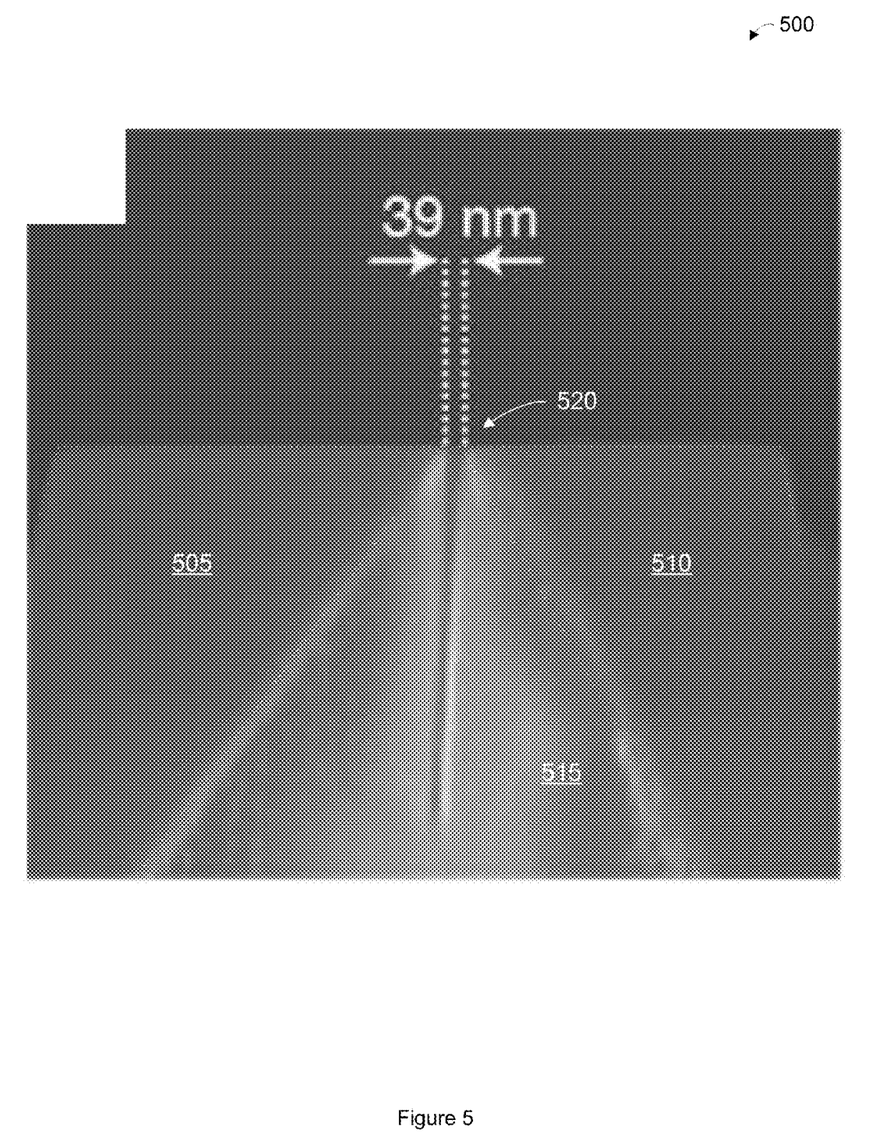

FIGS. 4 and 5 show examples of scanning electron microscope (SEM) micrographs of a campanile probe. As shown in the SEM micrograph of FIG. 4, a campanile probe 400 includes a four-sided pyramidal-shaped structure 405 with a square or rectangular base 410. The dimension bar shown in FIG. 4 indicates that the thickness or width of the base of the four-sided pyramidal-shaped structure of the campanile probe 400 is 1.07 microns.

As shown in the SEM micrograph of FIG. 5, an apex 500 of a campanile probe includes a first metal layer 505, a second metal layer 510, and a dielectric material 515; white dotted lines are included in FIG. 5 to more clearly define the dielectric material and the metal layers. A gap 520 is defined between the first metal layer 505 and the second metal layer 510. The gap 520 does not include any of the first or second metal layers 505 and 510, and the dielectric material 515 has been removed from the gap. In FIG. 5, the dimension bar indicates that the width of the gap at the apex of the campanile probe is 39 nm.

In some embodiments, a metal-insulator-metal (MIM) probe may include a tapered cylindrical coaxial structure at an apex of a transparent tip, instead of a four-sided pyramidal-shaped structure as in a campanile probe. Light from a tapered cylindrical coaxial structure may be of a different polarization compared to light from a campanile probe including a four-sided pyramidal-shaped structure. Further, a MIM probe including a tapered cylindrical coaxial structure may have a sharper apex or end than the four-sided pyramidal-shaped structure of a campanile probe, which may improve the topographical mapping capabilities of a MIM probe.

Figure 6A:
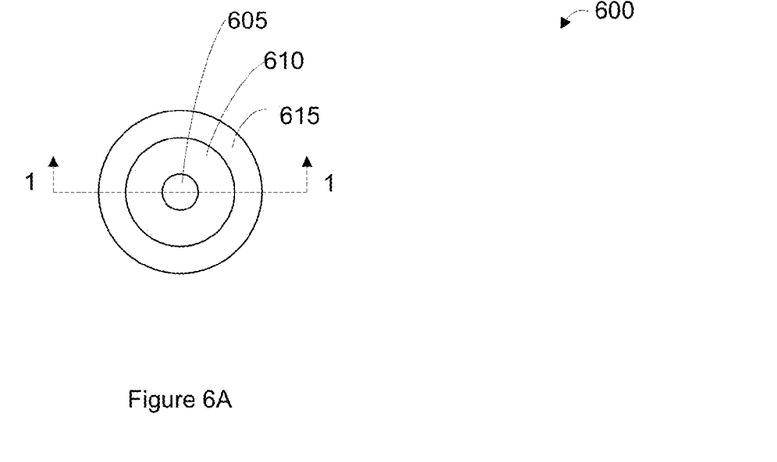
FIG. 6A shows an example of a top-down schematic illustration of an end or apex of a MIM probe.
Figure 6B:
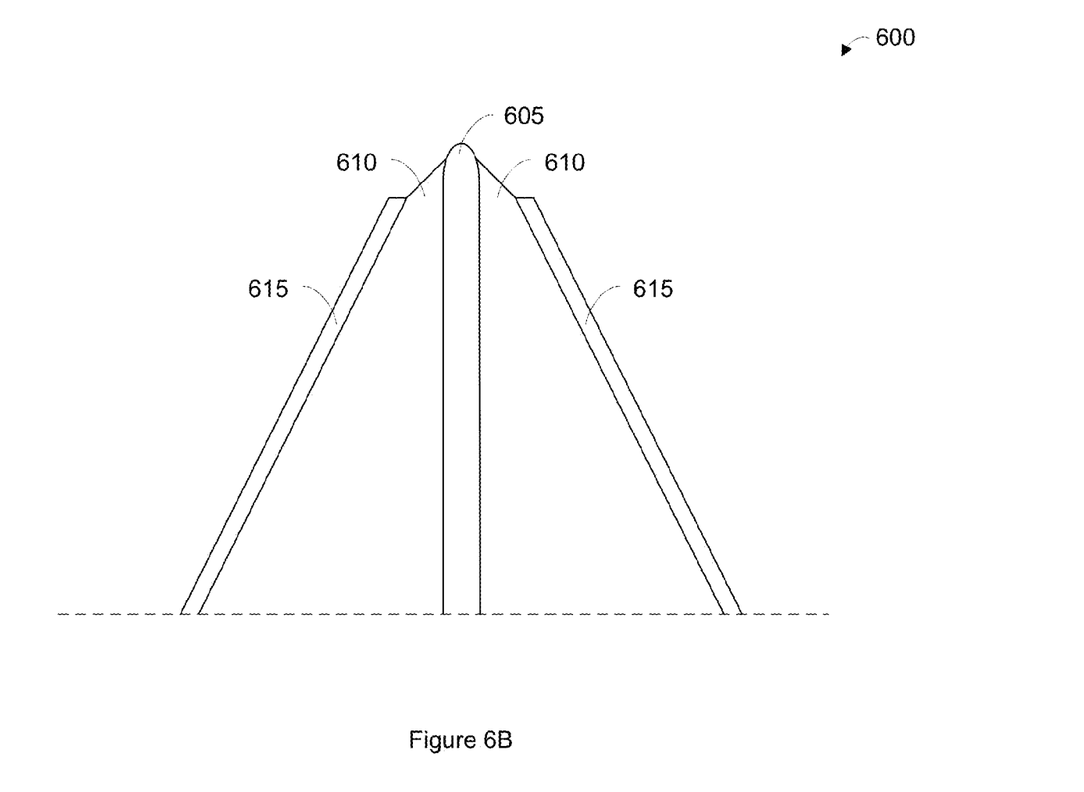
FIG. 6B shows an example of a cross-sectional schematic illustration of a MIM probe including a tapered cylindrical coaxial structure.

FIG. 6A shows an example of a top-down schematic illustration of a tip or apex of a MIM probe. FIG. 6B shows an example of a cross-sectional schematic illustration of a MIM probe including a tapered cylindrical coaxial structure. The cross-sectional schematic illustration shown in 6B is through line 1-1 of FIG. 6A.

As shown in FIGS. 6A and 6B, a MIM probe 600 includes a metal probe 605, a dielectric material 610, and a metal layer 615 disposed over the dielectric material. In some embodiments, the metal probe 605 and the metal layer 615 are not in electrical contact.

In some embodiments, the dielectric material 610 forms a cone-shaped structure. In some embodiments, the dielectric material 610 substantially forms a right circular cone. In some embodiments, the metal probe 605 extends along an axis of the cone-shaped structure formed by the dielectric material 610; the axis of a cone is the straight line, passing through the apex of the cone, about which the base of the cone has a rotational symmetry. In some embodiments, an end of the MIM probe 600 includes an exposed tip of the metal probe 605, with the dielectric material 610 surrounding the metal probe 605 except at the end or apex and at a base of the metal probe 605. In some embodiments, the metal layer 615 is disposed over the dielectric material 610, with a portion of the dielectric material 610 not including the metal layer 615. In some embodiments, the portion of the dielectric material 610 proximate the end or apex of the MIM probe 600 not including the metal layer 615 serves to electrically insulate the metal probe 605 from the metal layer 615.

In some embodiments, a gap between metal probe 605 and metal layer 615 at the apex of the MIM probe 600 may be about 1 nm to 100 nm, about 2 nm to 50 nm, or less about 10 nm. With the MIM probe 600 as shown in FIGS. 6A and 6B, the gap may be considered the shortest distance between the metal probe 605 and metal layer 615. In some embodiments, sides or edges of the metal probe 605 may be spaced equidistantly apart from the metal layer 615; that is, the MIM probe 600 may be substantially circularly symmetric when viewed from the top-down, as shown in FIG. 6A.

In some embodiments, the metal probe 605 may comprise gold, silver, copper, or aluminum. In some embodiments, the metal probe 605 may have a diameter of about 1 nm to 3 nm, or about 2 nm, at the end or apex of the MIM probe 600 (i.e., at the top of the MIM probe 600 as shown in FIG. 6B). In some embodiments, the metal probe 605 may have a diameter of about 10 nm to 100 nm a base of the MIM probe 600 (i.e., at the bottom of the MIM probe 600 as shown in FIG. 6B).

In some embodiments, the dielectric material 610 may comprise an optically transparent polymer, diamond, silicon oxide, silicon nitride, aluminum oxide, indium tin oxide, and hafnium oxide. In some embodiments, the dielectric material 610 may be disposed on the metal probe 605.

In some embodiments, the metal layer 615 may comprise gold, silver, copper, or aluminum. In some embodiments, the metal layer 615 may be about may be about 25 nm to 75 nm thick, or about 50 nm thick. In some embodiments, the metal layer 615 may be greater than about 75 nm thick.

Similar to the campanile probe 100 described with respect to FIGS. 1-3, in some embodiments, the MIM probe 600 may include an adhesion layer (now shown) disposed on the dielectric material 610. The metal layer 615 is disposed on the adhesion layer. The adhesion layer may aid in adhering the metal layer 615 to the dielectric material 610. In some embodiments, the adhesion layer may comprise a metal. For example, in some embodiments, the adhesion layer may comprise titanium or chromium. In some embodiments, the adhesion layer may be about 1 nm to 5 nm thick, or about 2 nm thick.

Again, similar to the campanile probe 100 described with respect to FIGS. 1-3, in some embodiments, the MIM probe 600 may include a dielectric layer (not shown) disposed on the exterior surfaces of the MIM probe 600, including metal probe 605, the dielectric layer 610, and the metal layer 615. In some embodiments, the dielectric layer comprises silicon oxide, aluminum oxide, hafnium oxide, or silicon nitride. In some embodiments, the dielectric layer may be about 2 nm to 5 nm thick.

Figure 7:
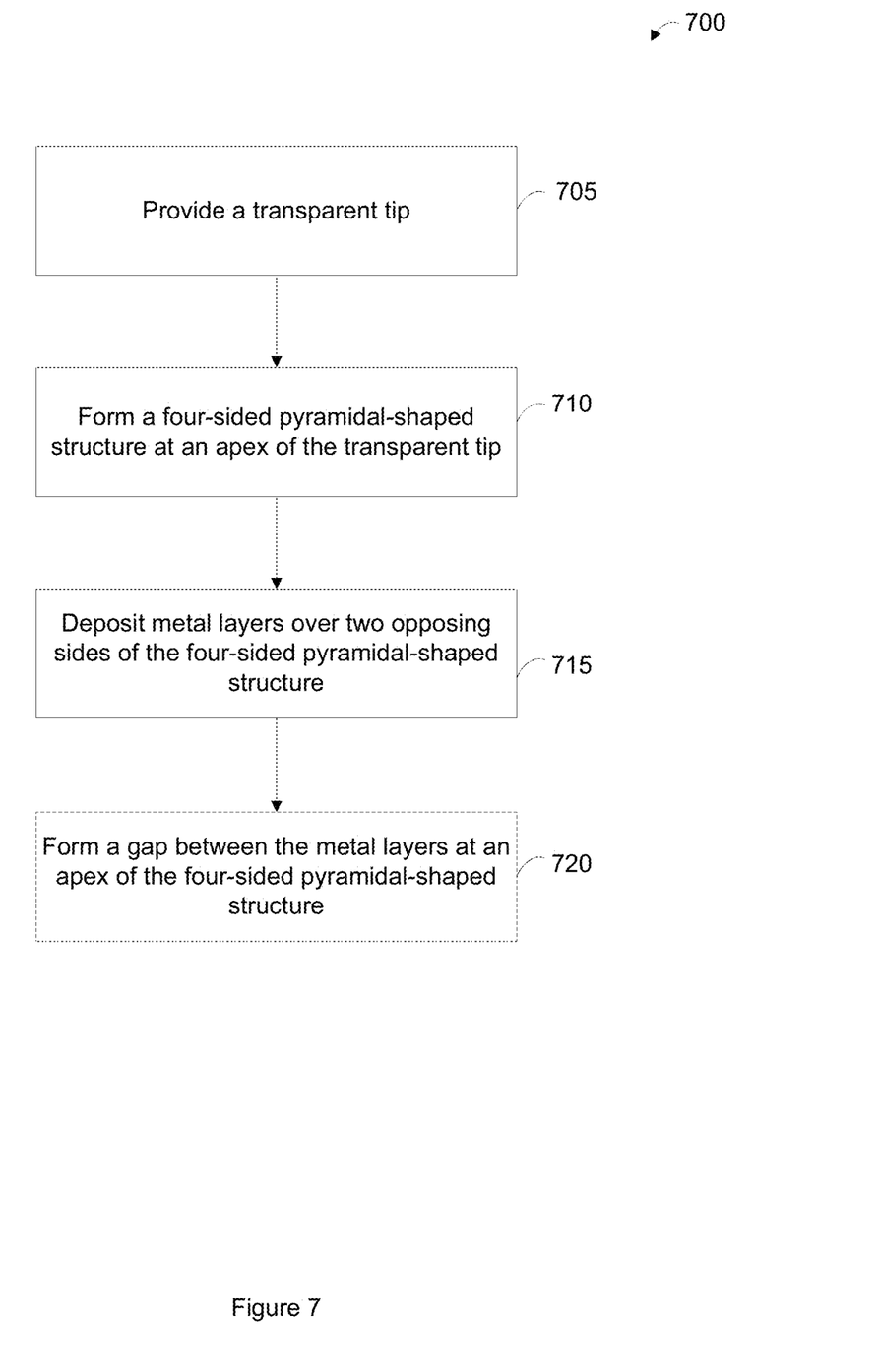
FIG. 7 shows an example of a flow diagram illustrating a manufacturing process for a campanile probe.

FIG. 7 shows an example of a flow diagram illustrating a manufacturing process for a campanile probe. The methods disclosed herein may be used to fabricate any of the campanile probes described herein. Starting at block 705 of a process 700, a transparent tip comprising a dielectric material is provided. In some embodiments, the dielectric material of the transparent tip may comprise an optically transparent material. In some embodiments, the dielectric material may comprise an optically transparent polymer, diamond, silicon oxide, silicon nitride, aluminum oxide, indium tin oxide, and hafnium oxide.

In some embodiments, the transparent tip may be fabricated by etching an end of an optical fiber to form a cone-shaped structure. In some embodiments, the etching process may comprise a wet-etching process using, for example, hydrofluoric acid (HF). In some embodiments, the optical fiber may have a diameter of about 1.2 microns to 3.8 microns, or about 2.5 microns. In some embodiments, the cone-shaped structure may have a tip radius of about 50 nm to 150 nm, or about 100 nm. In some embodiments, the transparent tip may be a scanning probe tip, such as an atomic force microscopy tip, for example.

Returning to FIG. 7, at block 710 of the process 700 a four-sided pyramidal-shaped structure is formed at an apex of the transparent tip. In some embodiments, the four-sided pyramidal-shaped structure is formed using a focused ion beam. For example, a focused ion beam may be used to remove material from the transparent tip in such a manner that the four-sided pyramidal-shaped structure remains at the apex of the transparent tip. In some embodiments, the focused ion beam may use gallium ions or argon ions. In some embodiments, the focused ion beam may use helium ions, which may improve the resolution of the focused ion beam compared to other ions.

At block 715 of the process 700, metal layers are deposited over two opposing sides of the four-sided pyramidal-shaped structure. In some embodiments, the metal layers may be deposited using a shadow evaporation process or an angle-resolved evaporation process. In some embodiments, the metal layers may be deposited using an atomic layer deposition (ALD) process. In some embodiments, the metal layers may comprise gold, silver, copper, or aluminum. In some embodiments, the metal layers may be about 25 nm to 75 nm thick, or about 50 nm thick. In some embodiments, the metal layers may be greater than about 75 nm thick.

In some embodiments, the metal layers may not be in electrical contact at the apex of the four-sided pyramidal-shaped structure or a well-defined gap between the metal layers may be present at the apex of the four-sided pyramidal-shaped structure after block 715. For example, in some embodiments, the metal deposition process at block 715 may produce a well-defined gap or space between the two metal layers.

In some embodiments, the metal layers may be in electrical contact at the apex of the four-sided pyramidal-shaped structure or a well-defined gap between the metal layers may not be present at the apex of the four-sided pyramidal-shaped structure after block 715. For example, in some embodiments, the metal deposition process at block 715 may not produce a well-defined gap or space between the two metal layers. When the metal layers are in electrical contact or there is not a well-defined gap at the apex of the four-sided pyramidal-shaped structure, a gap between the metal layer may be formed with an additional operation at block 720.

For example, at block 720 of the process 700, a gap is formed between the metal layers at an apex of the four-sided pyramidal-shaped structure. Forming a gap at block 720 helps to ensure that there is a well-defined gap or space between the metal layers and that there in not electrical contact between the metal layers. Many different processes may be used to form a gap between the metal layers at block 720.

In some embodiments, the gap may be formed using a focused ion beam. In some embodiments, the focused ion beam may use gallium ions or argon ions. In some embodiments, the focused ion beam may use helium ions, which may improve the resolution of the focused ion beam compared to other ions.

In some embodiments, forming the gap may include forming a gap between the metal layers and removing the dielectric material of the transparent tip between the metal layers, resulting in a gap as shown in FIG. 3. In some embodiments, forming the gap may include directing a focused ion beam along the z-direction of a campanile probe (as shown in FIG. 1). In some embodiments, the gap may be about 1 nm to 100 nm wide, about 2 nm to 50 nm wide, or less than about 10 nm wide, between the two metal layers, and about 25 nm to 75 nm deep; i.e., the gap may define an open region not including any material (i.e., the dielectric material or the metal layers). In some embodiments, a length of the gap (i.e., into the paper of the cross sectional schematic illustration shown in FIG. 3) may be about 1 nm to 15 nm, about 15 nm to 45 nm, or about 30 nm.

In some embodiments, forming the gap may include forming a gap between the metal layers, with the dielectric material of the transparent tip remaining between the metal layers, resulting in a gap as shown in FIG. 2A. In some embodiments, forming the gap may include an ion milling process in which x-y planes (as shown in FIG. 1) of material are removed from the apex of a four-sided pyramidal-shaped structure. In some embodiments, the gap may be about 1 nm to 100 nm wide, about 2 nm to 50 nm wide, or less than about 10 nm wide, between the two meal layers. In some embodiments, the gap may define a substantially flat surface of the dielectric material of the transparent tip, and separate the metal layers by about 1 nm to 100 nm, about 2 nm to 50 nm, or by less than about 10 nm. In some embodiments, a length of the gap (i.e., into the paper of the cross sectional schematic illustration shown in FIG. 2A) may be about 1 nm to 15 nm, about 15 nm to 45 nm, or about 30 nm.

In some embodiments, forming the gap may include applying a current and a voltage to the two metal layers of a sufficient strength to melt any metal connection between the two metal layers at the apex of the four-sided pyramidal-shaped structure. When the metal at the apex melts, the metal may form small spheres (i.e., due to surface tension), and this may sever the electrical contact between the two metal layers.

In some embodiments, forming the gap may include inducing mechanical stresses at the apex of the four-sided pyramidal-shaped structure that cause the end of the apex to break off or fracture. For example, due to thermal expansion mismatches between the transparent tip and the metal layers, mechanical stresses may be induced in the in the four-sided pyramidal-shaped structure by heating it up and then cooling it down. As another example, when the material of the transparent tip is a piezoelectric material, a voltage may be applied across the transparent tip which may induce mechanical stresses.

In some embodiments of the process 700, before block 715, adhesion layers may be deposited on the two opposing sides of the four-sided pyramidal-shaped structure. The metal layers may be deposited on the adhesion layers at block 715.

In some embodiments, the adhesion layers may comprise a metal. For example, in some embodiments, the adhesion layers may comprise titanium or chromium. In some embodiments, the adhesion layers may be about 1 nm to 5 nm thick, or about 2 nm thick. In some embodiments, the adhesion layers may be deposited using a shadow evaporation process or an ALD process.

In some embodiments of the process 700, before block 715, surfaces of the four-sided pyramidal-shaped structure may be functionalized with thiol groups (e.g., sulfhydryl groups). In some embodiments, the thiol groups may improve the adhesion of the metal layers to the dielectric material of the four-sided pyramidal-shaped structure while absorbing little or no light. Further details regarding adhesion layers and functionalization with thiol groups can be found in Terefe G. Habteyes, Scott Dhuey, Erin Wood, Daniel Gargas, Stefano Cabrini, P. James Schuck, A. Paul Alivisatos, and Stephen R. Leone, Metallic Adhesion Layer Induced Plasmon Damping and Molecular Linker as a Nondamping Alternative, ACS Nano, 2012, 6 (6), pp 5702-5709, which is herein incorporated by reference.

In some embodiments, the process 700 may further include depositing a dielectric layer over the four-sided pyramidal-shaped structure after block 715 or block 720. In some embodiments, the dielectric layer may be deposited on the entire four-sided pyramidal-shaped structure, including the metal layers. In some embodiments, the dielectric layer may be deposited with an ALD process or a chemical vapor deposition process. In some embodiments, the dielectric layer comprises silicon oxide, aluminum oxide, hafnium oxide, or silicon nitride. In some embodiments, the dielectric layer may be about 2 nm to 5 nm thick.

In some embodiments, a process similar to the process 700 may be performed, but instead of depositing metal layers at block 715, doped semiconductor layers may be deposited. Such a process may be used to fabricate a campanile probe configured to operate with infrared light, as described with respect to the campanile probe 100 shown in FIG. 1.

EXAMPLE

The following example of experiments performed with a campanile probe as disclosed herein is intended to be an example of methods of use of the embodiments disclosed herein, and is not intended to be limiting.

To demonstrate the utility of campanile probes, campanile probes with about 40 nm wide gaps were used to map out the inhomogeneous radiative recombination in individual indium phosphide (InP) nanowires (NWs), chosen because of their photoluminescence emission properties and their potential as a nanomaterial for light harvesting due to the 1.4 eV band gap and assumed low surface recombination rates. Trap states are believed to be responsible for many optical phenomena in nanocrystals and wires, including surface-state-mediated luminescence modification in InP NWs, but are not well-understood due to optical resolution limitations. Gaining this insight requires both local optical excitation and local luminescence collection.

A glass fiber with a campanile probe was mounted in a shear-force scanner and coupled to a 633 nm laser. The near-field spot was scanned over the sample to locally excite and collect the photoluminescence from the InP NWs. Because of the broadband enhancement, only 100 µW of pre-fibercoupled laser excitation power was needed to collect and disperse a full emission spectrum with a high resolution grating between 760 nm and 900 nm. With a 100 ms integration time, a signal-to-noise ratio >60/1 was achieved.

Topography and a full spectrum were recorded at each image pixel, and photoluminescence maps were built by taking slices from the hyperspectral data. The confocal excitation power used for a far-field confocal microscope was equivalent to that used for the campanile probe to achieve a comparable signal to noise ratio. The campanile probe provided resolution approximately equal to the gap size and much higher than the confocal resolution.

It has previously been observed that strong photoluminescence enhancements and photoluminescence blue shifts result from passivated InP NW surfaces. This was attributed to Coulombic interactions between excitons and positively-charged trap states on the NW surfaces. These studies substantiated the hypothesis that trap states influence the optoelectronic properties of nanocrystals and nanowires much more strongly than commonly assumed. The exciton diffusion length in these materials is hundreds of nanometers, and therefore individual trap states within the diffusion volume should strongly influence the local absorption energy and charge recombination rate. However, this has not been directly observed due to the lack of resolution.

It is believed that the observed heterogeneity along the wires on length scales well below the exciton diffusion length are direct maps of trap-state modifications of the local exciton properties. The observed photoluminescence intensity hot spots are likely due to an increase of trap state densities (and changes in the native oxide layer) at the wire ends resulting from the NW broken-end morphology. Their spectral characteristics are consistent with a trap-induced Stark shift, predicted to be ~60 meV to 70 meV above the band edge for positive trap states, in accordance with these experiments. Additionally, local trap states are known to cause Fermi level pinning and local band bending in some cases, which would also affect local recombination rates. In contrast, the absence of spectral variations in confocal measurements can be attributed to (a) the lack of spatial resolution and (b) the far-field photoluminescence measurement probing the entire NW thickness; i.e., surface-specific effects are obscured by bulk behavior. Catholuminesence measurements on InP NWs achieve a comparable resolution and provide complementary information. However, the large number of incident electrons fill the trap states and do not detect any spatial variation in emission from InP NWs.

It should be noted that the increased density of optical states at the tip apex (i.e., the apex of the four-sided pyramidal-shaped structure) will change the balance between various recombination pathways and may enable otherwise dark states to radiatively recombine. It should also be noted that measurements on NWs, and any sample thicker than about 2 nm, are not possible with a-NSOM in tip-substrate gap mode, and therefore all other near-field/tip-enhanced techniques previously demonstrated lack the signal strength and sensitivity shown here, which is critical for investigating the majority of samples.

Campanile probe far- to near-field transformers provide a pathway for understanding energy conversion processes at their critical length scales, which, for example, yielded new insights into the role of local trap states on radiative charge recombination in InP NWs. More generally, this example demonstrates the potential impact of the campanile probe geometry on a wide range of nano-optical measurements, since virtually all possible categories of optical imaging and spectroscopy can now be brought to the nanoscale, including Raman and IR/FTIR hyperspectral imaging, as well as white-light nanoellipsometry/interferometric mapping of dielectric functions. Additionally, it is expected that the combination of large bandwidth and enhancement will make campanile probes useful for ultrafast, pump-probe and/or nonlinear experiments down to molecular length scales, where they would be used for ultrasensitive medical detection, (photo) catalysis and quantum-optics investigations, as plasmonic optomechanics and circuitry elements, and as the cornerstone of tabletop high-harmonic/X-ray and photoemission sources.

CONCLUSION

Further details regarding the above-disclosed embodiments can be found in "Mapping Local Charge Recombination Heterogeneity by Multidimensional Nanospectroscopic Imaging," Wei Bao, M. Melli, N. Caselli, F. Riboli, D. S. Wiersma, M. Staffaroni, H. Choo, D. F. Ogletree, S. Aloni, J. Bokor, S. Cabrini, F. Intonti, M. B. Salmeron, E. Yablonovitch, P. J. Schuck, and A. Weber-Bargioni, Science 7 Dec. 2012: 338 (6112), 1317-1321, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
(a) providing a transparent tip comprising a dielectric material;
(b) forming a four-sided pyramidal-shaped structure at an apex of the transparent tip using a focused ion beam; and
(c) depositing a first layer of a material over a first side of the four-sided pyramidal-shaped structure and depositing a second layer of the material over a second side of the four-sided pyramidal-shaped structure, the first side and the second side being two opposing sides of the four-sided pyramidal-shaped structure, the material comprising a metal or a doped semiconductor, an apex of the four-sided pyramidal-shaped structure including a gap between the first layer of the material and the second layer of the material, the gap comprising a substantially flat surface of the dielectric material of the transparent tip.

2. The method of claim 1, further comprising:
forming the gap between the first layer of the material and the second layer of the material at the apex of the four-sided pyramidal-shaped structure.

3. The method of claim 1, wherein the material comprises a metal, further comprising:
before operation (c), depositing a first adhesion layer on the first side and a second adhesion layer on the second side of the four-sided pyramidal-shaped structure, wherein the first layer of the material and the second layer of the material are deposited on the first adhesion layer and the second adhesion layer, respectively.

4. The method of claim 3, wherein depositing the first adhesion layer and the second adhesion layer is performed with a shadow evaporation process, and wherein the first adhesion layer and the second adhesion layer comprise a metal.

5. The method of claim 1, wherein the material comprises a metal, further comprising:
- after operation (c), depositing a dielectric layer over the four-sided pyramidal-shaped structure, including the first layer of the material and the second layer of the material.

6. The method of claim 5, wherein the dielectric layer is about 2 nanometers to 5 nanometers thick.

7. The method of claim 5, wherein the dielectric layer is selected from a group consisting of silicon oxide, aluminum oxide, hafnium oxide, and silicon nitride.

8. The method of claim 1, wherein operation (c) is performed with a shadow evaporation process.

9. The method of claim 1, wherein the material comprises a metal selected from a group consisting of gold, silver, copper, and aluminum.

10. The method of claim 1, wherein the first layer of the material and the second layer of the material are about 25 nanometers to 75 nanometers thick.

11. The method of claim 1, wherein the gap is about 1 nanometer to 100 nanometers wide between the first layer of the material and the second layer of the material.

12. The method of claim 1, wherein the dielectric material is selected from a group consisting of an optically transparent polymer, diamond, silicon oxide, silicon nitride, aluminum oxide, indium tin oxide, and hafnium oxide.

13. The method of claim 1, wherein the material comprises a doped semiconductor selected from a group consisting of doped-titanium oxide, doped-zirconium oxide, doped-zinc oxide, and tin-doped indium oxide (ITO).

14. A device comprising:
- a transparent tip comprising a dielectric material, an apex of the transparent tip including a four-sided pyramidal-shaped structure;
- a first metal layer disposed over a first side of the four-sided pyramidal-shaped structure and a second metal layer disposed over a second side of the four-sided pyramidal-shaped structure, the first side and the second side being two opposing sides of the four-sided pyramidal-shaped structure, an apex of the four-sided pyramidal-shaped structure including a gap between the first metal layer and the second metal layer, the gap comprising a substantially flat surface of the dielectric material of the transparent tip.

15. The device of claim 14, further comprising:
- a first adhesion layer disposed on the first side and a second adhesion layer disposed on a second side of the four-sided pyramidal-shaped structure, wherein the first metal layer and the second metal layer are disposed on the first adhesion layer and the second adhesion layer, respectively.

16. The device of claim 15, wherein the first adhesion layer and the second adhesion layer are selected from a group consisting of titanium and chromium.

17. The device of claim 14, a dielectric layer disposed on the four-sided pyramidal-shaped structure, including the first metal layer and the second metal layer, wherein the dielectric layer is selected from a group consisting of silicon oxide, aluminum oxide, hafnium oxide, and silicon nitride.

18. The device of claim 17, wherein the dielectric layer is about 2 nanometers to 5 nanometers thick.

19. A device comprising:
- a transparent tip comprising a dielectric material, an apex of the transparent tip including a four-sided pyramidal-shaped structure;
- a first metal layer disposed over a first side of the four-sided pyramidal-shaped structure and a second metal layer disposed over a second side of the four-sided pyramidal-shaped structure, the first side and the second side being two opposing sides of the four-sided pyramidal-shaped structure, an apex of the four-sided pyramidal-shaped structure including a gap between the first metal layer and the second metal layer, the gap defining an open volume between the first metal layer and the second metal layer.

20. The method of claim 1, further comprising:
- removing a portion of the dielectric material at the apex of the four-sided pyramidal-shaped structure to form an open volume between the first layer of the material and the second layer of the material.

* * * * *